United States Patent
Kitamura

(10) Patent No.: US 9,729,733 B2
(45) Date of Patent: Aug. 8, 2017

(54) ELECTRONIC DOCUMENT FILE ACQUISITION REPRESENTING APPARATUS, ELECTRONIC DOCUMENT FILE ACQUISITION REPRESENTING METHOD AND RECORDING MEDIUM

(71) Applicant: Kyocera Document Solutions Inc., Osaka (JP)

(72) Inventor: Mitsuhiro Kitamura, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/953,449

(22) Filed: Nov. 30, 2015

(65) Prior Publication Data

US 2017/0155777 A1    Jun. 1, 2017

(51) Int. Cl.
*H04N 1/00* (2006.01)
*G06F 17/30* (2006.01)
*H04N 1/21* (2006.01)
*G06F 3/12* (2006.01)
*H04L 29/08* (2006.01)

(52) U.S. Cl.
CPC ....... *H04N 1/00212* (2013.01); *G06F 3/1204* (2013.01); *G06F 3/1268* (2013.01); *G06F 3/1275* (2013.01); *G06F 3/1286* (2013.01); *G06F 17/30011* (2013.01); *H04L 67/06* (2013.01); *H04N 1/00217* (2013.01); *H04N 1/2183* (2013.01); *H04N 2201/0094* (2013.01)

(58) Field of Classification Search
None
See application file for complete search history.

(56) References Cited

U.S. PATENT DOCUMENTS

| 4,460,975 A * | 7/1984 | Torkelsen | G06F 17/243 358/1.18 |
| 6,289,460 B1 * | 9/2001 | Hajmiragha | G06F 17/30011 700/83 |
| 6,592,629 B1 * | 7/2003 | Cullen | G06F 17/30011 358/403 |

(Continued)

FOREIGN PATENT DOCUMENTS

| JP | 2005-258780 A | 9/2005 |
| JP | 2006-253988 A | 9/2006 |

*Primary Examiner* — Ted Barnes
(74) *Attorney, Agent, or Firm* — James Judge

(57) ABSTRACT

A method autonomously represents an acquisition of an electronic document file from a request destination on behalf of a requestor. The method includes: configuring a request specification corresponding to input received from the requestor, the request specification including at least one electronic-document file request destination, a requested item specifying electronic-document file content, and storage location information indicating an electronic-document file storage location in a storage unit; creating a request communication file including content signifying that submission of an electronic document file prepared based on the requested item is requested of the at least one request destination; and transmitting the created request communication file to the request destination, monitoring response from the request destination to the transmission, and storing the electronic document file submitted from the request destination in the storage unit, based on the storage location information.

20 Claims, 10 Drawing Sheets

(56) References Cited

U.S. PATENT DOCUMENTS

| | | | | |
|---|---|---|---|---|
| 6,687,878 B1* | 2/2004 | Eintracht | | G06F 17/241 707/E17.117 |
| 7,123,371 B1* | 10/2006 | Yoda | | H04N 1/00204 358/1.14 |
| 7,757,162 B2* | 7/2010 | Barrus | | H04N 1/2183 715/230 |
| 8,248,625 B2* | 8/2012 | Paskalev | | G06F 3/1217 358/1.13 |
| 8,265,968 B2* | 9/2012 | Yaskin | | G06Q 10/06 705/1.1 |
| 8,296,170 B2* | 10/2012 | O'Brien | | G06Q 10/06 705/7.12 |
| 8,315,893 B2* | 11/2012 | Yaskin | | G06Q 10/06 705/1.1 |
| 8,326,659 B2* | 12/2012 | Yaskin | | G06Q 10/06 705/1.1 |
| 8,340,991 B2* | 12/2012 | Yaskin | | G06Q 10/06 705/1.1 |
| 8,340,992 B2* | 12/2012 | Yaskin | | G06Q 10/06 705/1.1 |
| 8,340,993 B2* | 12/2012 | Yaskin | | G06Q 10/06 705/7.11 |
| 8,458,283 B1* | 6/2013 | Chapweske | | H04N 1/00204 709/213 |
| 8,516,050 B1* | 8/2013 | Chapweske | | H04N 1/00204 709/204 |
| 8,738,414 B1* | 5/2014 | Nagar | | G06Q 10/101 705/7.12 |
| 9,077,828 B1* | 7/2015 | Koster | | H04M 3/5231 |
| 9,418,325 B1* | 8/2016 | Kitamura | | G06K 15/4095 |
| 2002/0035697 A1* | 3/2002 | McCurdy | | G06F 17/30011 726/3 |
| 2002/0059076 A1* | 5/2002 | Grainger | | G06Q 10/10 705/50 |
| 2003/0046351 A1* | 3/2003 | Maruyama | | G06Q 10/10 709/206 |
| 2003/0093525 A1* | 5/2003 | Yeung | | H04L 29/06 709/225 |
| 2003/0234967 A1* | 12/2003 | Rodriguez | | G06F 17/30011 358/518 |
| 2004/0073684 A1* | 4/2004 | Jodra | | H04N 1/00244 709/228 |
| 2005/0030570 A1* | 2/2005 | Wiechers | | H04N 1/00132 358/1.13 |
| 2005/0055627 A1* | 3/2005 | Lloyd | | G06F 17/21 715/268 |
| 2005/0060638 A1* | 3/2005 | Mathew | | G06Q 10/06 715/255 |
| 2005/0108323 A1* | 5/2005 | Taylor | | H04L 12/589 709/203 |
| 2005/0198347 A1* | 9/2005 | Wangoo | | G06F 3/1204 709/232 |
| 2006/0039707 A1* | 2/2006 | Mima | | B41J 2/17546 399/23 |
| 2006/0055968 A1* | 3/2006 | Sato | | H04N 1/32358 358/1.15 |
| 2006/0074793 A1* | 4/2006 | Hibbert | | G06Q 40/00 705/38 |
| 2006/0129924 A1* | 6/2006 | Nelson | | G06Q 30/00 715/255 |
| 2006/0259524 A1* | 11/2006 | Horton | | G06F 17/24 |
| 2006/0271526 A1* | 11/2006 | Charnock | | G06Q 30/02 |
| 2006/0274367 A1* | 12/2006 | Yamamoto | | G06F 3/1204 358/1.15 |
| 2007/0078853 A1* | 4/2007 | Shutt | | G06F 17/30011 |
| 2007/0162749 A1* | 7/2007 | Lim | | G06F 21/6227 713/167 |
| 2007/0226355 A1* | 9/2007 | Luckhardt | | G06F 17/24 709/227 |
| 2008/0007789 A1* | 1/2008 | La | | H04N 1/32619 358/400 |
| 2008/0007791 A1* | 1/2008 | Nagarajan | | H04N 1/32619 358/402 |
| 2008/0077530 A1* | 3/2008 | Banas | | G06Q 10/06 705/50 |
| 2008/0082903 A1* | 4/2008 | McCurdy | | G06F 17/30011 715/200 |
| 2008/0100874 A1* | 5/2008 | Mayer | | G06F 21/645 358/403 |
| 2008/0104408 A1* | 5/2008 | Mayer | | H04N 1/32112 713/178 |
| 2008/0133295 A1* | 6/2008 | Cappel | | G06Q 10/00 705/36 T |
| 2008/0192288 A1* | 8/2008 | Kitamura | | H04N 1/00209 358/1.15 |
| 2008/0204794 A1* | 8/2008 | Watterson | | G06F 3/1204 358/1.15 |
| 2008/0235070 A1* | 9/2008 | Seliger | | G06Q 10/06 705/7.24 |
| 2009/0051947 A1* | 2/2009 | Kuroshima | | G06Q 30/06 358/1.9 |
| 2009/0076880 A1* | 3/2009 | Kramer | | G06Q 10/06393 705/7.39 |
| 2009/0190171 A1* | 7/2009 | Nemoto | | G06F 21/6218 358/1.15 |
| 2009/0279137 A1* | 11/2009 | Mori | | G06F 3/1204 358/1.15 |
| 2009/0317786 A1* | 12/2009 | Alcorn | | G09B 5/02 434/323 |
| 2010/0161993 A1* | 6/2010 | Mayer | | G06F 21/64 713/178 |
| 2010/0202022 A1* | 8/2010 | Sato | | G06F 17/211 358/1.18 |
| 2010/0280962 A1* | 11/2010 | Chan | | G06Q 10/103 705/301 |
| 2010/0315661 A1* | 12/2010 | Sato | | G06F 3/1225 358/1.9 |
| 2011/0075191 A1* | 3/2011 | Meunier | | G06Q 10/107 358/1.15 |
| 2011/0113348 A1* | 5/2011 | Twiss | | G06Q 10/10 715/753 |
| 2012/0054667 A1* | 3/2012 | Beykpour | | G06F 3/0486 715/781 |
| 2012/0054674 A1* | 3/2012 | Beykpour | | G06F 3/0481 715/788 |
| 2012/0092689 A1* | 4/2012 | Ito | | G06F 3/1204 358/1.13 |
| 2012/0154854 A1* | 6/2012 | Sato | | G06F 3/1204 358/1.15 |
| 2012/0243028 A1* | 9/2012 | Dumitrescu | | G06F 3/1275 358/1.15 |
| 2013/0318035 A1* | 11/2013 | Swanson | | H04N 1/00204 707/608 |
| 2014/0055804 A1* | 2/2014 | Eguchi | | G06F 3/1285 358/1.14 |
| 2014/0118780 A1* | 5/2014 | Kimura | | G06F 3/1222 358/1.15 |
| 2014/0176993 A1* | 6/2014 | Kato | | H04N 1/00244 358/1.15 |
| 2014/0333653 A1* | 11/2014 | Polit | | H04N 17/00 345/589 |
| 2014/0347690 A1* | 11/2014 | Sato | | G06F 3/1275 358/1.15 |
| 2015/0131124 A1* | 5/2015 | Roy | | G06F 3/126 358/1.15 |
| 2015/0138592 A1* | 5/2015 | Yokoyama | | G07G 1/00 358/1.15 |
| 2015/0215487 A1* | 7/2015 | Maezawa | | H04N 1/04 358/474 |
| 2015/0355734 A1* | 12/2015 | Lo | | G06F 3/03545 345/179 |
| 2015/0363733 A1* | 12/2015 | Brown | | G06Q 10/06316 705/7.26 |
| 2016/0231887 A1* | 8/2016 | Hatano | | G06F 3/0482 |

* cited by examiner

FIG. 3A

| No. | Box name | Owner | Type | Used |
|---|---|---|---|---|
| 01 | Test data | User A | Storage | 12MB |
| 02 | Weekly report submission request | Secretary A (User A) | Job | 0MB |
| | | | | |

Document box — 131a

Search — 135a / 136a

Document request (132a) | Document save (133a) | Register/Edit (134a)

FIG. 3B

Address Book (Secretary A) — 131b

| Name | Mail | SMB | FTP | Fax | Deadline |
|---|---|---|---|---|---|

| No. | Destination | Owner | Type | E-mail Address |
|---|---|---|---|---|
| 01 | Administrator | User A | Requestor | user_a@example.com |
| 02 | Operator | Secretary A | Submission Destination | y_secretary102815@box.com |
| 03 | Concerned Personnel | User B | Request Destination | user_b@example.com |
| 04 | Concerned Personnel | User C | Request Destination | user_c@example.com |
| 05 | Concerned Personnel | User D | Request Destination | user_d@example.com |
| | | | | |

137b

Cancel | Return | Register/Edit — 134b

FIG. 5A

| Address Book (Secretary A) | | 131c |
|---|---|---|
| Name | Mail | SMB | FTP | Fax | Deadline |

| Host Name | user_a_PC |
|---|---|
| Path | smb:report_nov._3rdw: |
| Use | Electronic document file submission request from Secretary A |
| Login Name | user_a |
| Login password | *********** |

137c

Cancel | Return | Register/Edit — 134c

FIG. 5B

| Address Book (Secretary A) | | 131d |
|---|---|---|
| Name | Mail | SMB | FTP | Fax | Deadline |

| Submission Deadline | 3 P.M. Nov. 2nd (Mon), 2015 |
|---|---|
| Reminder | 9 A.M. Nov. 2nd (Mon), 2015 |
| Time zone | West Coast |

137d

Cancel | Return | Register/Edit — 134d

FIG. 6

| Create mail | Reply | Reply to all | Forward | |
|---|---|---|---|---|

401

From:     user_a@example.com
To:       y_secretary102815@box.com
Subject:  Weekly report submission request (10/26-10/30)

Attached file: Weekly report template (10/26-10/30)

To all the member of Software Development Group, Development Department

Please send this week's weekly report in following manners.
The contact operator is an E-Secretary.
I'd appreciate your correspondence.

****Weekly report*******

Deadline: 15:00 Nov. 2nd (Mon) (West Coast time)
Format: Recommended to use the attached file
Submission methods:
1. Attach on this mail, and reply
2. Set this mail as a cover, and execute a document scanning by MFP
3. Print the attached file, write by hand, and execute a document scanning by MFP
4. Store in a specified document box — 401ht Best regards,
Taro YAMADA
Development Department

Operation weekly report

Division name: Development Group Name    From Oct. 26th, 2015 to Oct. 30th, 201[5]

| This week's activity target |
|---|
|  |

| Date | Activity content | Result and others |
|---|---|---|
| (Mon) 10/26 |  |  |
| (Tue) 10/27 |  |  |
| (Wed) 10/28 |  |  |
| (Thu) 10/29 |  |  |
| (Fri) 10/30 |  |  |
|  |  |  |

| Report to the supervisor |
|---|
|  |

| This week's reflection point and others |
|---|
|  |

FIG. 8

| Create mail | Reply | Reply to all | Forward | |
|---|---|---|---|---|

403

From: y_secretary102815@box.com
To: user_b@example.com; user_c@example.com; user_d@example.com
Subject: Weekly report submission request (10/26-10/30)

Attached file: Weekly report template (10/26-10/30)

To all the member of Software Development Group, Development Department

Please send this week's weekly report in following manners.
The contact operator is an E-Secretary.
I'd appreciate your correspondence.

***Weekly report*******

Deadline: 15:00 Nov. 2nd (Mon) (West Coast time)
Format: Recommended to use the attached file
Submission methods:
1. Attach on this mail, and reply
2. Set this mail as a cover, and execute a document scanning by MFP
3. Print the attached file, write by hand, and execute a document scanning by MFP
4. Store in a specified document box 401ht

QC

Best regards,
Taro YAMADA
Development Department
Contact operator: Secretary A

404

ELECTRONIC DOCUMENT FILE ACQUISITION REPRESENTING APPARATUS, ELECTRONIC DOCUMENT FILE ACQUISITION REPRESENTING METHOD AND RECORDING MEDIUM

BACKGROUND

Unless otherwise indicated herein, the description in this section is not prior art to the claims in this application and is not admitted to be prior art by inclusion in this section.

An image forming apparatus (for example, printer, multifunction printer, or multi-functional peripheral) enhances the convenience of users by including a storage area, what is called, a document box. As a method using the document box, there are proposed a technique that collects information on a predetermined item from a plurality of users to put into one document, and a technique that associates a workflow with the document box to execute a sequence of automated processes with respect to data entered in the document box.

SUMMARY

A method according to one aspect of the disclosure autonomously represents an acquisition of an electronic document file from a request destination on behalf of a requestor. The method includes: configuring a request specification corresponding to input received from the requestor, the request specification including at least one electronic-document file request destination, a requested item specifying electronic-document file content, and storage location information indicating an electronic-document file storage location in a storage unit; creating a request communication file including content signifying that submission of an electronic document file prepared based on the requested item is requested of the at least one request destination; and transmitting the created request communication file to the request destination, monitoring response from the request destination to the transmission, and storing the electronic document file submitted from the request destination in the storage unit, based on the storage location information.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3A is an explanatory diagram illustrating a user interface screen used at a document-submission-request-job creating process according to the one embodiment.

FIG. 3B is an explanatory diagram illustrating a user interface screen used at the document-submission-request-job creating process according to the one embodiment.

FIG. 5A is an explanatory diagram illustrating a user interface screen used at the document-submission-request-job creating process according to the one embodiment.

FIG. 5B is an explanatory diagram illustrating a user interface screen used at the document-submission-request-job creating process according to the one embodiment.

FIG. 6 is an explanatory diagram illustrating an exemplary e-mail used at content setting process according to the one embodiment.

FIG. 8 is an explanatory diagram illustrating an exemplary e-mail used at a document submission request according to the one embodiment.

DETAILED DESCRIPTION

Figure 1:
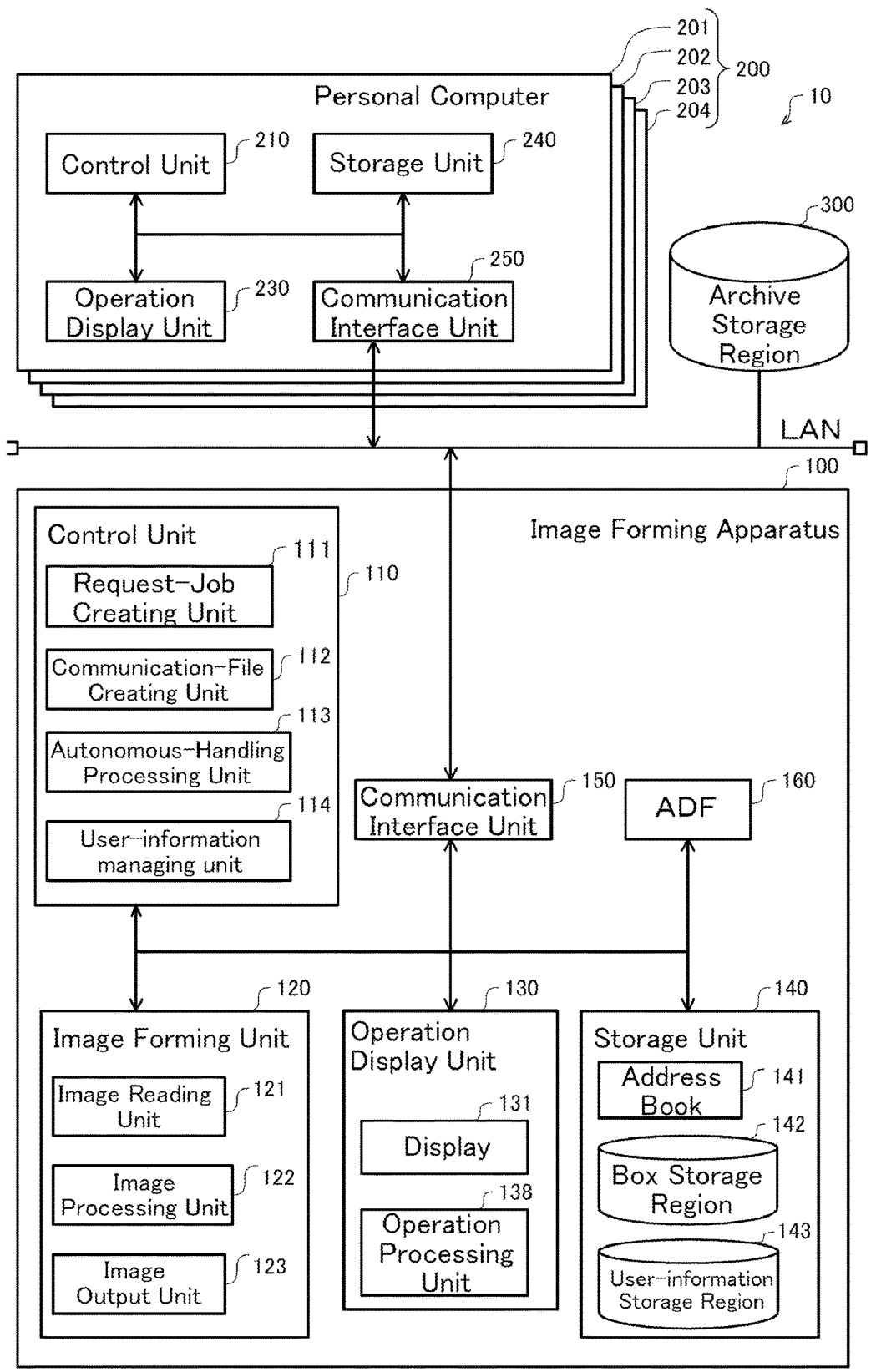
FIG. 1 is a block diagram illustrating a functional configuration of an image forming system 10 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. Embodiments

The following describes embodiments of the disclosure (hereinafter referred to as, the "embodiments") with reference to the drawings.

FIG. 1 is a block diagram illustrating a functional configuration of an image forming system 10 according to one embodiment of the disclosure. The image forming system 10 includes an image forming apparatus 100, four personal computers 200 (201 to 204), and an archive storage region 300. The four personal computers 200 are connected to the image forming apparatus 100 via networks (in this example, LANs). The four personal computers 201 to 204 are used by respective users A to D.

The image forming apparatus 100 includes a control unit 110, an image forming unit 120, an operation display unit 130, a storage unit 140, a communication interface unit 150, and an automatic document feeder (ADF) 160. The personal computer 200 includes a control unit 210, an operation display unit 230, a storage unit 240, and a communication interface unit 250. The control unit 110 includes a request-job creating unit 111, a communication-file creating unit 112, an autonomous-handling processing unit 113, and a user-information managing unit 114. Functions of these units will be described later.

The communication interface unit 150 and the communication interface unit 250 communicate using a TCP/IP (transmission control protocol/internet protocol) protocol group. The communication interface unit 150 also functions as an SMTP (simple mail transfer protocol) server in this embodiment.

The image forming unit 120 includes an image reading unit 121, an image processing unit 122, and an image output unit 123. The image reading unit 121 creates scan data by reading an image from an original document. The image processing unit 122 processes the scan data in accordance with a print setting. The image output unit 123 prints on a print medium based on the processed scan data.

The operation display unit 130 of the image forming apparatus 100 includes a display 131 and an operation processing unit 138. The display 131 functions as a touch panel so as to display various menus as an entry screen. The operation processing unit 138 accepts an operation input of a user from the display 131 that functions as a touch panel, and various kinds of buttons and switches (not illustrated).

The control units 110 and 210 include a main storage unit such as a RAM and a ROM, and a control unit such as an MPU (micro-processing unit) and a CPU (central processing unit). The control units 110 and 210 include a controller function regarding the interface such as various kinds of I/Os, USBs (universal serial buses), buses, and other hardware so as to control the whole image forming apparatus 100 and the whole personal computer 200 respectively.

The storage units 140 and 240, which are storage devices configured to include such as a hard disk drive or a flash memory as non-transitory recording mediums, store control programs and data of processes executed by the respective control units 110 and 210.

The storage unit 140 further includes an address book 141, a box storage region 142, and a user-information Storage Region 143. In this embodiment, the user-information Storage Region 143 records user information and passwords of the respective users A to D of the four personal computers 201 to 204. The box storage region 142 assigns storage regions available for the respective users A to D of the plurality of personal computers 200. The user-information Storage Region 143 includes personal information such as passwords for authentication of respective users linked to the users recorded on the address book 141.

Figure 2:
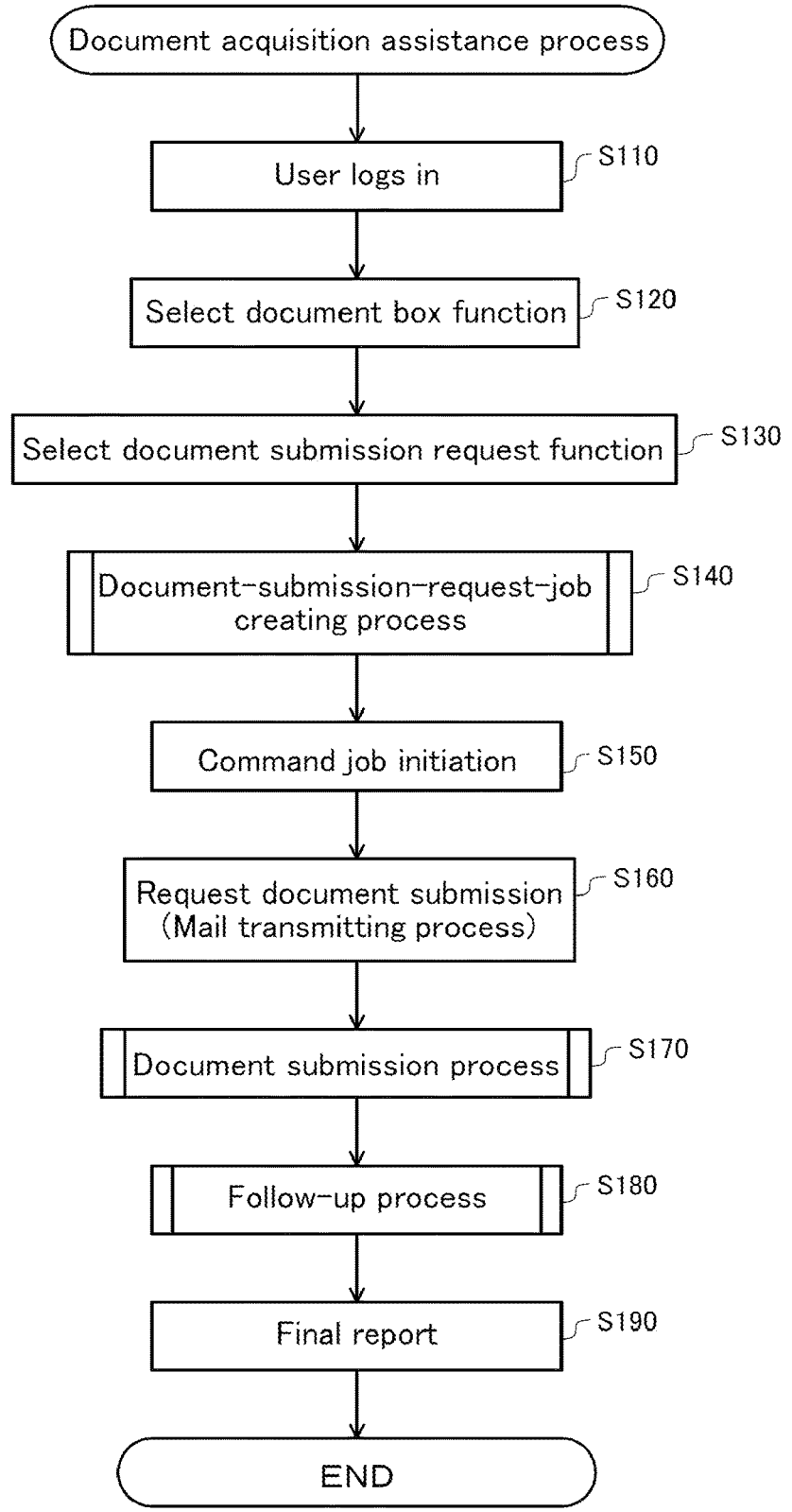
FIG. 2 is a flowchart illustrating content of a document acquisition assistance process according to the one embodiment.

FIG. 2 is a flowchart illustrating content of a document acquisition assistance process according to the one embodiment. At this exemplary document acquisition assistance process, a user A desires a document submission from three users B, C, and D. In this embodiment, the user A can request the image forming apparatus 100 to represent for a document acquisition from the three users B, C, and D.

At Step S110, the user A logs in to the image forming apparatus 100. The login is executed by inputting a user name and a password of the user A into the image forming apparatus 100. The user name and the password for authentication of the user A have been recorded in the user-information Storage Region 143 in the image forming apparatus 100. The user-information managing unit 114 uses the user name and the password for authentication read from the user-information Storage Region 143 so as to perform the authentication based on the input password. The user-information managing unit 114 also records information on that a document box function is acceptable to the user A. The login may be a remote login from the personal computer 201 used by the user A.

At Step S120, the user A selects the document box function. The document box function includes a plurality of functions using the box storage region 142 in the storage unit 140 of the image forming apparatus 100. The document box function also includes a document submission request function.

At Step S130, the user A selects the document submission request function. The document submission request function is a function that causes the image forming apparatus 100 to represent for a document submission request operation with respect to users to which the image forming apparatus 100 can access.

FIGS. 3A and 3B are explanatory diagrams illustrating user interface screens used at a document-submission-request-job creating process according to the one embodiment. FIG. 3A illustrates a function selection screen 131a for selecting the document box function. The function selection screen 131a includes a document request button 132a, a document save button 133a, a register/edit button 134a, a search window 135a used for a document box search, and a search button 136a.

The user A touches the register/edit button 134a on the function selection screen 131a so as to display a new document box button (not illustrated), and touches the new document box button. This ensures a new created document box in the box storage region 142. On the function selection screen 131a, two document boxes 01 and 02 on which a No. 01 and a No. 02 are attached respectively are already displayed.

Since the document box 01 on which the No. 01 is attached is set to "store" as a type, the document box 01, for example, can store scan data created by the image reading unit 121. Specifically, a user sets an original document on the image reading unit 121, selects a document box on which the No. 01 is attached, touches the document save button 133a, and sets such as an original document type and reading density as necessary. After that, the user presses a start button (not illustrated) of the operation display unit 130. This enables the image forming apparatus 100 to store the scan data of the original document in the document box 01 automatically. Any name (for example, test data) can be given to the document box 01, and an owner (user A) only can use the document box 01.

Since the document box 02 on which the No. 02 is attached is set to "job" as a type, the document box 02 can execute a job as an agency for the owner (user A). In this embodiment, the document box 02 executes a document-submission-request-job that requests an electronic document file submission from a third person instead of the owner (user A).

At Step S140, the image forming apparatus 100 executes the document-submission-request-job creating process. The document-submission-request-job creating process is a process where the image forming apparatus 100 creates the document-submission-request-job in response to a request from the user A. A new document box is created, and the user A touches the document request button 132a in a state where this new document box is selected. This ensures initiating the document-submission-request-job creating process. The document box 02 is configured in the following method.

Figure 4:
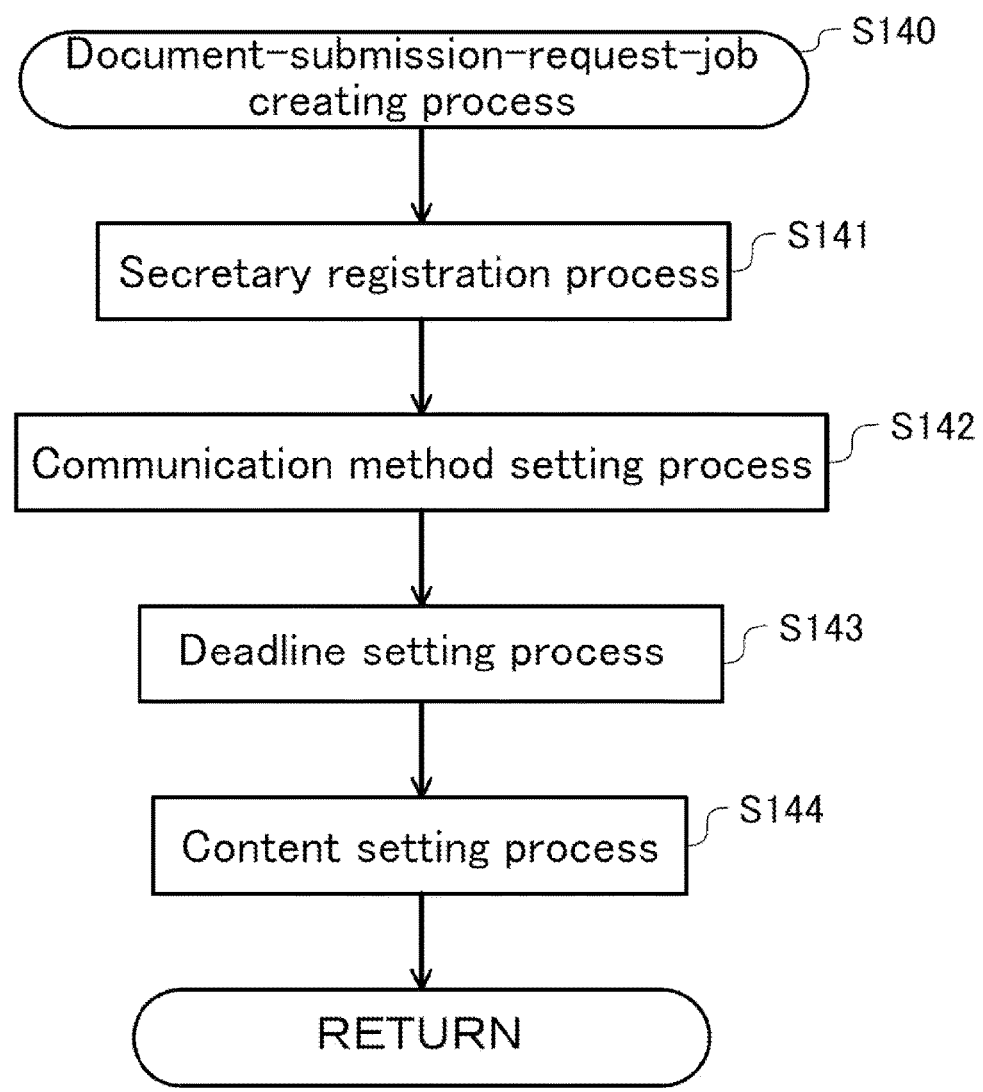
FIG. 4 is a flowchart illustrating content of the document-submission-request-job creating process according to the one embodiment.

FIG. 4 is a flowchart illustrating content of the document-submission-request-job creating process according to the one embodiment. The document-submission-request-job is a job where the image forming apparatus 100 executes a secretary operation as an agency for the user A. This secretary operation is autonomously executed by the image forming apparatus 100 that functions as an agent. The secretary operation has content that requests the electronic document file submission from the users B, C, and D instead of the user A.

A request-job creating unit 111 of the control unit 110 in the image forming apparatus 100, which functions as a request specification configuring unit, configures the following as items of requested specification for the secretary operation. These configurations may be performed on the personal computer 201 used by the user A, through which the image forming apparatus 100 is remotely logged in.

(1) A communication method (such as an e-mail, an SMB, or a FTP)
(2) A storage location for a submitted electronic document file (a path within the document box)
(3) A communication destination of the users B, C, and D as request destinations
(4) A communication destination of the user A as a requestor
(5) A requested item that specifies content of the electronic document file At Step S141, the request-job creating unit 111 executes a secretary registration process. The secretary registration process is a process that registers a secretary A personalized as a driver of the document-submission-request-job in the user-information Storage Region 143 as a user. At the secretary registration process, the document-submission-request-job creating process is initiated, namely, a new document box is created and the user A touches the document request button 132a in a state where this document box is selected. Then, the request-job creating unit 111 further automatically registers the e-mail of the secretary A in the address book 141. A name of the secretary A is automatically created and editable.

At Step S142, the request-job creating unit 111 executes a communication method setting process. The communication method setting process is a process that sets a communication method between the image forming apparatus 100 and the users A to D. The communication method setting process is a process that executes a setting by selecting a communication method among such as an e-mail, a FTP, and an SMB by a user in the address book 141.

FIG. 3B illustrates an e-mail setting screen 131b used at the communication method setting process. The e-mail setting screen 131b includes such as a register/edit button 134b. The user A touches the register/edit button 134b so as to select the secretary A in the address book 141. This enables the request-job creating unit 111 to automatically create an e-mail address (y_secretaryl02815@box.com). This e-mail address can be automatically determined using, for example, "y," an initial of a setting person and a numeral representing date and time when the setting starts, 3:00 PM Oct. 28$^{th}$.

The user A touches the register/edit button 134b so as to select the request destinations (users B, C, and D) in the address book 141. Accordingly, between the secretary A of the image forming apparatus 100 and the request destinations (users B, C, and D), as a communication method, the e-mail is selected. This enables the image forming apparatus 100 to execute a communication for an electronic document file submission request with the request destinations (users B, C, and D) by e-mail, and enables the request destinations (users B, C and D) to transmit the electronic document file as an attached file to an e-mail to the image forming apparatus 100. The e-mail received by the image forming apparatus 100 is stored in the document box 02 separately or together from/with the attached file. The communication method may be set for each job, or may be set for each user in the job. The request destination is not necessarily registered in the address book 141, and an e-mail may be set manually.

In this example, furthermore, the request destinations (users B, C, and D) are set to be able to use a file transfer protocol (FTP) on the electronic document file submission. For an upload of the electronic document file, a setting for a server message block (SMB) is also available. The SMB is a protocol and a communication service to execute a file sharing and a sharing of the image forming apparatus 100 in the personal computer 201 on the LAN.

On the other hand, between the image forming apparatus 100 and the requestor (user A), the e-mail and the SMB are assumed to be selected. The e-mail is used for communications such as the electronic document file submission request from the requestor (user A) to the image forming apparatus 100, and a report of an electronic document file submission state (transmission of report communication file) from the image forming apparatus 100 to the requestor (user A). The SMB is used for a transmission of the electronic document files submitted from the users B, C, and D to the personal computer 201 of the user A.

FIGS. 5A and 5B are explanatory diagrams that illustrate a user interface screen used at the document-submission-request-job creating process according to the one embodiment. FIG. 5A illustrates an SMB setting screen 131c used at the communication method setting process. The SMB setting screen 131c includes some buttons such as a register/edit button 134c. The user A touches the register/edit button 134c so as to select whether or not using the SMB as a submission method of the electronic document file from the secretary A.

In this example, when "SMB use" is selected, for a communication from the secretary A, while the e-mail is basically used, the SMB is used only on the electronic document file submission, and the electronic document file will be submitted in a predetermined folder specified by a path of the personal computer 201 used by the user A. On the other hand, when "SMB non-use" is selected, the e-mail will be used for every communication.

At Step S143, the request-job creating unit 111 executes a deadline setting process. The deadline setting process is a process that sets a submission deadline and a reminder date and time of the electronic document file in response to an input from the user A.

FIG. 5B illustrates a deadline setting screen 131d used at the deadline setting process. The deadline setting screen 131d includes such as a register/edit button 134d. The user A can touch the register/edit button 134d so as to set the submission deadline and the reminder date and time. In this example, 3 P.M. Nov. 2$^{nd}$, 2015 is set as the submission deadline, and 9 A.M. Nov. 2$^{nd}$, 2015 is set as the reminder date and time.

The reminder date and time is a date and time at which an e-mail is transmitted to notify a person, who has not submitted the electronic document file, of the deadline if the electronic document file, which is the requested target, has not been submitted by the reminder date and time. For the deadline and the reminder date and time, it is also possible to set a time zone to consider a time difference. Specifically, when the time zone is set to West Coast, the deadline is a time in the West Coast time zone. On the other hand, the reminder date and time are set at earlier time corresponding to the time difference.

For example, 3 P.M. in West Coast (deadline) corresponds to 8 A.M. on the next day in Japan time, while 9 A.M. in West Coast (reminder date and time) corresponds to 2 A.M. on the next day in Japan time. In this case, the reminder is adjusted to earlier side corresponding to the time difference so as to be transmitted at 9 A.M. in Japan time, and will notify that 8 A.M on the next day is the deadline in Japan time. This ensures a smooth submission even if there is a time difference between the requestor and the request destination of the document submission.

At Step S144, the request-job creating unit 111 executes content setting process. The content setting process is a process that sets a specification regarding content of the electronic document file corresponding to an input from the user A. The content setting process, for example, can be executed by transmitting an e-mail whose attached file is a format of a submission target electronic document file from the user A to the secretary A. The communication-file creating unit 112 uses this e-mail to create the following e-mail, automatically.

FIG. 6 is an explanatory diagram illustrating an exemplary e-mail used at the content setting process according to the one embodiment. An e-mail 401 is an e-mail transmitted from the user A to the secretary A. A recommended format (described below) on the electronic document file submission is attached to the e-mail 401. The e-mail 401 includes a hypertext 401ht to use an FTP for the document submission.

The request-job creating unit 111 causes the process to return to Step S150 (see FIG. 2) corresponding to the completion of the content setting process. At the content setting process, the communication-file creating unit 112 creates a QR code QC (registered trademark) so as to embed this QR code QC into the e-mail 401 and the recommended format. The QR code QC includes various information to be used for the document-submission-request-job.

Figure 7:
FIG. 7 is an explanatory diagram illustrating an exemplary attached file of the e-mail used at the document-submission-request-job creating process according to the one embodiment.

FIG. 7 is an explanatory diagram illustrating an exemplary attached file of the e-mail used at the document-submission-request-job creating process according to the one embodiment. On the recommended format, the QR code QC is embedded so as to create a format 402. The content setting process completes by creations of an e-mail 403 (described below) and the format 402 where the respective QR codes QC are included. When the user A remotely logs in the image forming apparatus 100 as described above, the user A may create this e-mail on the personal computer 201. In this case, the image forming apparatus 100 may display a user interface screen (not shown) for pasting an automatically created QR code and a hypertext.

At Step S150, the user A presses a start button (not illustrated) of the operation display unit 130 so as to command an initiation of the document-submission-request-job. At Step S160, an autonomous-handling processing unit 113 requests the users B, C, and D who are set as request destinations of the document submission at Step S142. The request of the document submission is executed by the autonomous-handling processing unit 113 that transmits the e-mail 403, into which the QR code QC is embedded, via the communication interface unit 150.

FIG. 8 is an explanatory diagram illustrating an exemplary e-mail used at a document submission request according to the one embodiment. The e-mail 403 is transmitted by setting an originator of the e-mail 401, requested by the user A, to an e-mail address of the secretary A (y_secretaryl02815@box.com). A body text of the e-mail 403 is identical to the body text of the e-mail 401 except that the QR code QC is embedded and the addition of a text 404 (contact operator: secretary A). The e-mail 403 is created by the communication-file creating unit 112 as described above. On the e-mail 403 and the format 402, the respective QR codes QC are displayed. A one-dimensional code or two-dimensional another code is also applicable instead of the QR code QC. The format 402 is also referred to as a weekly report template in this example.

At Step S170, the request destinations (users B, C, and D) execute a document submission process. The document submission process can be executed in one of following four methods.

Figure 9:
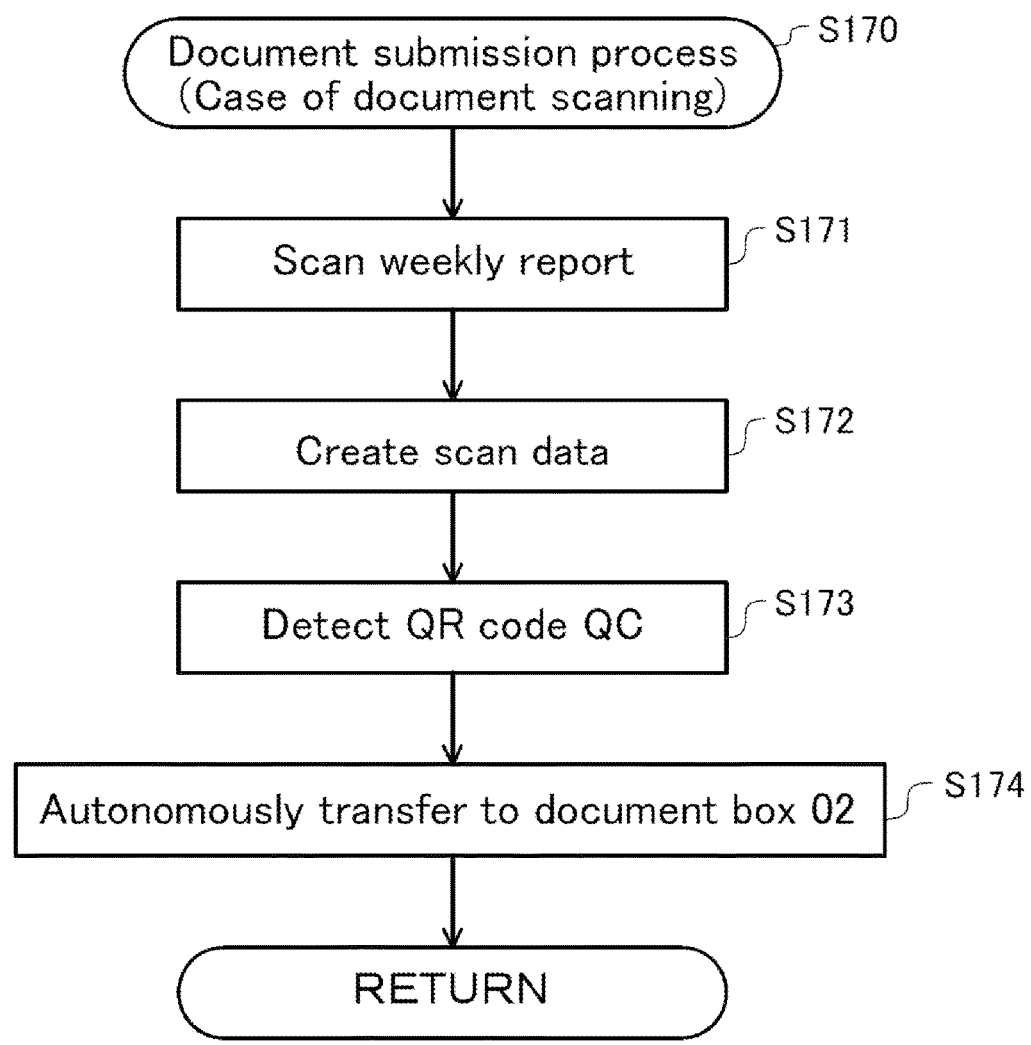
FIG. 9 is a flowchart illustrating content of a document submission process according to the one embodiment.

(1) Prepare a weekly report using a weekly report template 402 so as to attach on a reply e-mail to the secretary A (2) Prepare a weekly report by hand without using the weekly report template 402, and place the e-mail from the secretary A as a cover on the ADF 160 so as to scan the document (3) Prepare a weekly report by hand using the weekly report template 402, and set on the ADF 160 so as to scan the document (4) Prepare a weekly report using the weekly report template 402, and click the hypertext 401ht (specified document box) included in the e-mail from the secretary A so as to upload using the FTP FIG. 9 is a flowchart illustrating content of a document submission process (example of document scanning) according to the one embodiment. At Step S171, the request destinations (users B, C, and D) scan the respective weekly reports. The weekly report created using the weekly report template 402 (or the e-mail used as a cover) includes the QR code QC. The QR code QC includes as information, the e-mail address of the secretary A (y_secretaryl02815@box.com), a command to create an e-mail whose destination is this e-mail address, and a command to make scan data an attached file of this e-mail.

At Step S172, the image reading unit 121 creates scan data. The scan data is analyzed by the autonomous-handling processing unit 113. At Step S173, the autonomous-handling processing unit 113 decides that the scan data is the document submitted in response to the document submission request by detecting the QR code QC. At Step S174, the autonomous-handling processing unit 113 transfers the scan data to the document box 02. Thus, the autonomous-handling processing unit 113 can decide that the submitted document is the document submitted in response to the document submission request and transfer to the document box 02.

The image forming apparatus 100 may be configured to transmit the e-mail automatically on which the scan data is attached in response to a detection of the QR code QC. This enables to accept the document as well as the submission by e-mail even if another image forming apparatus 100 scans instead of the image forming apparatus 100 on which the document box 02 is set. In this case, an originator of the e-mail may be an e-mail address of the request destination who logged in.

When a weekly report file created using the weekly report template 402 is received as an e-mail attached file or uploaded using the FTP, the autonomous-handling processing unit 113 can decide that a submitted document by analyzing the weekly report file is a document submitted in response to the document submission request and store the submitted document in the document box 02.

The electronic document file (weekly report) is renamed to a name that facilitates a management by the secretary A as a document name on which the respective user names (users B, C, and D) and the date and time are added, and saved in the document box 02. The electronic document file (weekly report) will be saved in the document box 02 at a name whose date and time are different when submitted again from the request destinations (user B, C, and D).

In this case, the autonomous-handling processing unit 113 causes the communication-file creating unit 112 to create a correspondence whose content is to inquire whether the electronic document file (weekly report) submitted before can be deleted or not, to the request destination who has submitted the electronic document file (weekly report) again. The correspondence is, for example, to request a description, "overwrite" or "merge," to a subject line. The autonomous-handling processing unit 113 inquires of the request destination who has submitted the electronic document file (weekly report) again using this correspondence. When the description of the subject line of the e-mail from the request destination includes "overwrite," the autonomous-handling processing unit 113 deletes the electronic document file (weekly report) submitted before. When the description of the subject line of the e-mail from the request destination includes "merge," the autonomous-handling processing unit 113 merges these two electronic document files (weekly reports). When "overwrite" or "merge" is not described or described together to the subject line, the autonomous-handling processing unit 113 inquires whether "overwrite" or "merge" again.

At Step S180, the autonomous-handling processing unit 113 executes a follow-up process. The follow-up process is a process that promotes the document submission smoothly from the request destinations (users B, C, and D) of the document submission request.

Figure 10:
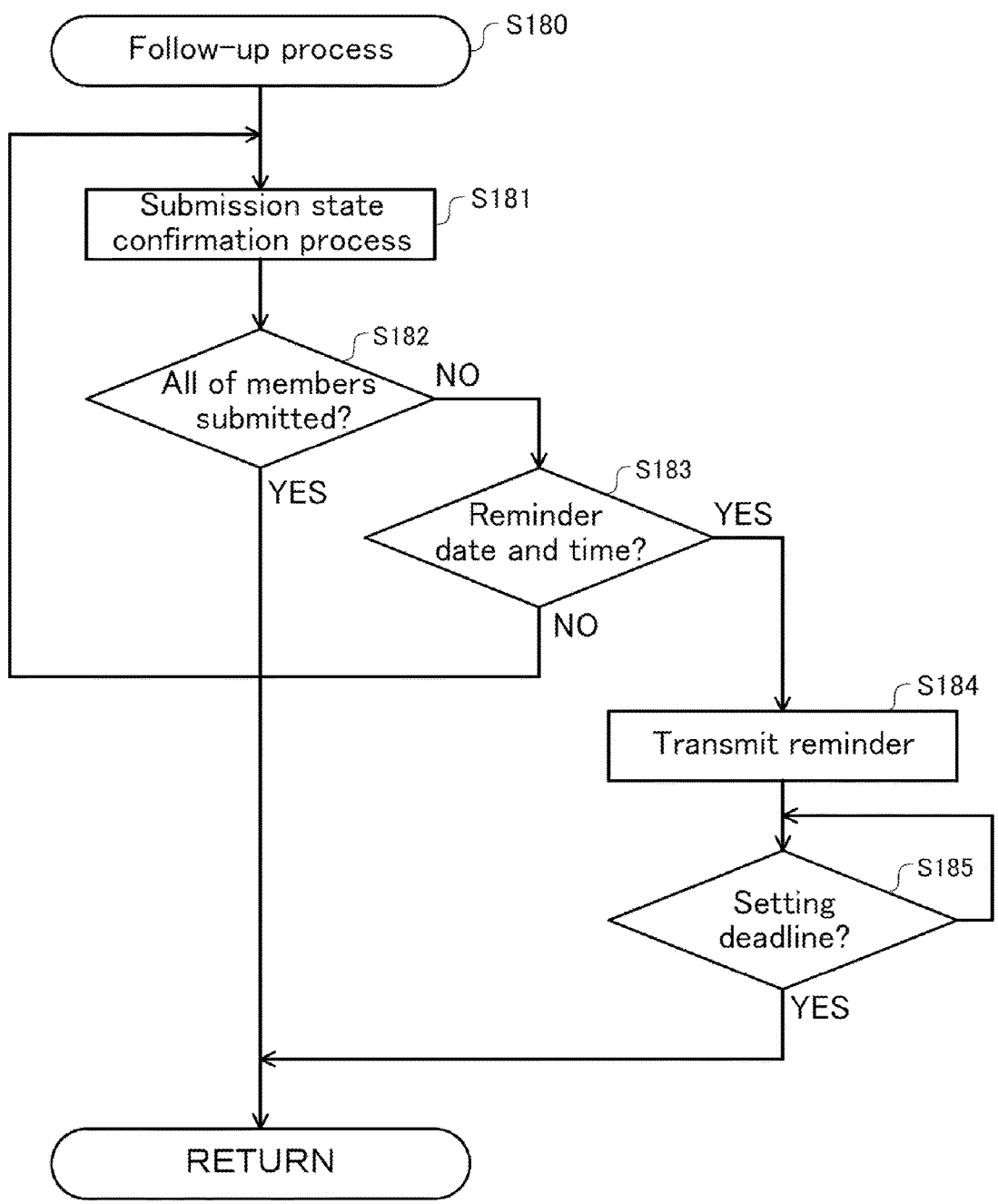
FIG. 10 is a flowchart illustrating content of a follow-up process according to the one embodiment.

FIG. 10 is a flowchart illustrating content of the follow-up process according to the one embodiment. At Step S181, the autonomous-handling processing unit 113 executes a submission state confirmation process. The submission state confirmation process is a process that monitors an incoming e-mail from the request destinations (users B, C, and D) at regular time intervals (for example, every 10 minute). The autonomous-handling processing unit 113 can confirm the electronic document file submission based on a receiving of the electronic document file including the QR code QC from the request destinations (users B, C, and D).

At Step S182, the autonomous-handling processing unit 113 confirms whether or not the electronic document files (weekly reports) have been submitted from all of the members of the request destinations (users B, C, and D). When the electronic document files (weekly reports) have been submitted from all of the members, the process proceeds to Step S190 (See FIG. 2). On the other hand, when the at least one person has not submitted, the process proceeds to Step S183.

The autonomous-handling processing unit 113 may be configured to be settable, for example, to cause the communication-file creating unit 112 to create a report communication file to report a submission state at a determined time every day so as to transmit this report communication file to the requestor.

At Step S183, the autonomous-handling processing unit 113 decides whether or not the date and time have reached the reminder date and time. When the date and time have reached the reminder date and time, the process proceeds to Step S184. When the date and time have not reached the reminder date and time, the process returns to Step S181.

At Step S184, the autonomous-handling processing unit 113 transmits a reminder (reminder communication file) by e-mail to the request destination who has not submitted. Since the deadline of the electronic document file (weekly report) is described in the reminder, the request destination who has not submitted can know that the submission deadline (in this example, 3 P.M. Nov. $2^{nd}$, 2015) is coming soon. The autonomous-handling processing unit 113 causes the process to proceed to Step S190 (See FIG. 2) when the setting deadline has reached (Step S185).

At Step S190, the autonomous-handling processing unit 113 executes the final report to the requestor. At the final report, the autonomous-handling processing unit 113 forwards the submitted electronic document file (weekly report) to a predetermined folder of the personal computer 201 by SMB and notifies the submission state by e-mail. The submission state is transmitted as the report communication file including information such as "all members have submitted" or "only user B has not submitted" by e-mail. On the other hand, the autonomous-handling processing unit 113 transmits a demand e-mail (demand communication file) to a person who has not submitted by e-mail. The autonomous-handling processing unit 113 finally stores all communications and data that are executed at the document-submission-request-job in the external archive storage region 300.

For example, a hyperlink on which a link to a Web interface is embedded may be inserted into the e-mail. This ensures a download of the electronic document file (weekly report) in response to a click on the hyperlink.

At Step S182, when the electronic document files (weekly reports) have been submitted from all of the members, the process immediately proceeds to Step S190. Thus, when the electronic document files (weekly reports) are submitted from all of the members of the request destinations (users B, C, and D), the electronic document files (weekly reports) can be promptly submitted to the requestor without waiting the submission deadline.

Thus, the image forming system 10 according to the one embodiment can autonomously assist a document exchange between staffs at an office, and can reduce workloads of the staff regarding the document exchange. Furthermore, the secretary A can inquire of the requestor whether or not to execute the document-submission-request-job, setting date and time again every week automatically, so as to set to execute every week in response to a confirmation.

B. Modifications

The disclosure will not be limited to respective embodiments described above, but modifications as follows are also possible.

Modification 1

While in the above-described embodiment the image forming system 10 includes a plurality of personal computers, the image forming system 10 is configurable even if the number of the personal computer is one. The disclosure is applicable to an operation management regarding a document creation and submission for the user oneself.

Modification 2

While in the above-described embodiment an identical e-mail is transmitted to a plurality of request destinations, for example, mutually different e-mails including respective QR codes where contains information of respective request destinations may be transmitted. This ensures, for example, on a submission by document scanning, an operation that automatically makes an originator an e-mail address read out from the QR code. Furthermore, this also ensures identification and management of every request destination by a secretary.

Modification 3

While in the above-described embodiment the requestor only can access directly to the document box, for example, information of the document box within the network may be stored by users associated to respective user IDs, and a box list regarding the user ID of the user who logs in may be indicated. In this case, information of the document box associated with the user ID may be stored in a storage unit of every image forming apparatus within the network. When the information of the document box associated with the user ID is stored only in a specific image forming apparatus, another image forming apparatus may transmit a request of the information with a user ID so as to acquire the information. Alternatively, when there is a server that controls the image forming apparatus within the network, this server may manage this information so as to execute the request of the information from the image forming apparatus to the server.

Modification 4

While in the above-described embodiment an image reading system is configured of the personal computer and the image forming apparatus connected to LAN, the image reading system is not necessarily configured of the personal computer and the image forming apparatus. Specifically, for example, an image reading apparatus may be used instead of the image forming apparatus. Furthermore, the image reading system may be configured connecting a smart phone or a tablet, and the image forming apparatus with a wireless communication such as BLUETOOTH (registered trademark). In this case, any of the smart phone or the tablet, and the image forming apparatus may provide a user interface for the document-submission-request-job creating process. A Web interface may provide a user interface for the document-submission-request-job creating process.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In an image forming system including an image forming apparatus having an image forming unit equipped with an image reading unit, an operation display unit equipped with a touchscreen for receiving user input of control operations, a storage unit having a document-box storage region, a communications interface, and a control unit configured to function as a request-job creating/request-specification configuring unit, as a communication-file creating unit, and as an autonomous-handling processing unit, the control unit, operation display unit, and document-box storage region enabling a document box function including a document submission request function, and the image forming system including a plurality of personal computers communicatively network-connected with the image forming apparatus via the communications interface, a method for causing the image forming apparatus to autonomously represent, on behalf of one of the personal computers as a requestor, acquisition of electronic document files from any of the other personal computers as request destinations, the method comprising:

accepting, via the touchscreen in the operation display unit, requestor-user selection of the document box function, and of a document submission request as included in the document box function;

via the request-job creating/request-specification configuring unit, and in response to the document submission request, executing a document-submission-request job creating process of registering a user as a secretary, the secretary being a submission destination for the acquisition of electronic document files, as requested by the document submission request, from the request-destination personal computers, the secretary registration initiating the document-submission-request job creating process, configuring a request specification corresponding to input received from the requestor personal computer, the request specification including a protocol for network communications between the image forming apparatus and the plurality of personal computers, at least one electronic-document file request-destination personal computer, a requested item specifying electronic-document file content, and storage location information indicating an electronic-document file storage location in the document-box storage region;

creating a request communication file including content signifying that submission of an electronic document file created based on the requested item in the request specification is requested of the at least one request-destination personal computer;

transmitting, according to the network communications protocol, the created request communication file to the at least one request-destination personal computer;

via the image reading unit, creating the electronic document file;

via the at least one request-destination personal computer, submitting the created electronic document file to the secretary, as a response from the at least one request-destination personal computer to the transmission of the created request communication file; and via the autonomous-handling processing unit, analyzing the electronic document file to determine that the electronic document file is submitted in response to the document submission request, and storing the electronic document file submitted from the at least one request-destination personal computer in the document-box storage region, based on the storage location information.

2. The method according to claim 1, wherein
the transmitting further includes transmitting a report communication file to the requestor personal computer, the report communication file including content indicating whether the electronic document file has been submitted or not for each of the at least one request-destination personal computers.

3. The method according to claim 1, wherein:
the request specification includes a submission deadline for the electronic document file; and
the transmitting further includes transmitting a demand communication file to the request-destination personal computers upon the submission falling due if any one of the at least one request-destination personal computers has not submitted the electronic document file within the submission deadline, the demand communication file including content of demanding a submission of the electronic document file.

4. The method according to claim 1, wherein:
the request specification includes a submission deadline for the electronic document file; and
the transmitting further includes
transmitting a demand communication file to the request-destination personal computers upon the submission falling due if any one of the at least one request-destination personal computers has not submitted the electronic document file within the submission deadline, the demand communication file including content of demanding a submission of the electronic document file, and transmitting a report communication file to the requestor personal computer, the report communication file including content indicating the one who has not submitted the electronic document file within the submission deadline for the electronic document file.

5. The method according to claim 1, wherein:

the request specification includes a reminder date and time set prior to a submission deadline for the electronic document file; and the transmitting further includes transmitting a reminder communication file upon arrival of the reminder date and time if any one of the at least one request-destination personal computers has not submitted the electronic document file by the reminder date and time, the reminder communication file including content of prompting the submission of the electronic document file by the submission deadline.

6. The method according to claim 1, wherein:

the request specification includes a reminder date and time set prior to a submission deadline for the electronic document file; and the transmitting further includes transmitting a reminder communication file upon arrival of the reminder date and time if any one of the at least one request-destination personal computers has not submitted the electronic document file by the reminder date and time, the reminder communication file including content of prompting the submission of the electronic document file by the submission deadline, and if a time difference between any of the request-destination personal computers and the requestor personal computer exists, advancing the reminder date and time such that a time at the request-destination personal computer corresponds to a time of the reminder date and time.

7. The method according to claim 1, wherein:

the request specification includes a reminder date and time set prior to a submission deadline for the electronic document file;

the transmitting further includes transmitting a reminder communication file upon arrival of the reminder date and time if any one of the at least one request-destination personal computers has not submitted the electronic document file by the reminder date and time, the reminder communication file including content of prompting the submission of the electronic document file by the submission deadline, and if a time difference between any of the request-destination personal computers and the requestor personal computer exists, advancing the reminder date and time such that a time at the request-destination personal computer corresponds to a time of the reminder date and time; and the reminder communication file includes information indicating the submission deadline in a time at the request-destination personal computer.

8. The method according to claim 1, wherein the transmitting includes employing an electronic mail to transmit the request communication file to the at least one request-destination personal computer.

9. The method according to claim 1, wherein:

the transmitting includes employing an electronic mail to transmit the request communication file to the at least one request-destination personal computer; and the electronic mail includes a link to transfer the electronic document file to the storage unit by file transfer protocol.

10. The method according to claim 1, further comprising:

configuring a virtual agent to represent the acquisition of the electronic document file; wherein the transmitting includes employing an electronic mail to transmit the request communication file to the at least one request-destination personal computer by the virtual agent, and the electronic mail is transmitted with an electronic mail address of the virtual agent as an originator address.

11. The method according to claim 1, further comprising:

configuring a virtual agent to represent the acquisition of the electronic document file; and preparing an address book in which the request-destination personal computers, the requestor personal computer, and the virtual agent are recorded; wherein the address book specifies a communication method between the request-destination personal computers, the requestor personal computer, and the virtual agent.

12. The method according to claim 1, wherein:

the creating includes creating a code and embedding the created code in the request communication file; and the code includes information for transmitting specific scan data, read along with the code as image data, to the storage unit when the code is read as an image.

13. The method according to claim 1, wherein:

the creating includes creating a code and embedding the created code in the request communication file; and the code includes an electronic mail address for transmitting specific scan data, read along with the code as image data, as an attachment of an electronic mail and information for initiating a program to create and send the electronic mail when the code is read as an image.

14. In an image forming system including an image forming apparatus having an image forming unit equipped with an image reading unit, an operation display unit equipped with a touchscreen for receiving user input of control operations, a storage unit having a document-box storage region, a communications interface, and a control unit configured to function as a request-job creating/request-specification configuring unit, as a communication-file creating unit, and as an autonomous-handling processing unit, the control unit, operation display unit, and document-box storage region enabling a document box function including a document submission request function, and the image forming system including a plurality of personal computers communicatively network-connected with the image forming apparatus via the communications interface, an electronic-document-file acquisition representing apparatus for autonomously representing, on behalf of one of the personal computers as a requestor, acquisition of electronic document files from any of the other personal computers as request destinations, the touchscreen in the operation display unit accepting requestor-user selection of the document box function, and of a document submission request as included in the document box function, in response to the document submission request, and the request-job creating/request-specification configuring unit executing a document-submission-request job creating process of registering a user as a secretary, the secretary being a submission destination for the acquisition of electronic document files, as requested by the document submission request, from the request-destination personal computers, the secretary registration initiating the document-submission-request job creating process, the apparatus comprising:

a request specification configuring unit that configures a request specification corresponding to input received from the requestor personal computer, the request specification including
- a protocol for network communications between the image forming apparatus and the plurality of personal computers,
- at least one electronic-document file request-destination personal computer,
- a requested item specifying electronic-document file content, and
- storage location information indicating an electronic-document file storage location in the document-box storage region;

a communication-file creating unit that creates a request communication file including content signifying that submission of an electronic document file created based on the requested item in the request specification is requested of the at least one request-destination personal computer; and an autonomous-handling processing unit that transmits, according to the network communications protocol, the created request communication file to the at least one request-destination personal computer, monitors response from the at least one request-destination personal computer to the transmission of the created request communication file, and stores the electronic document file submitted from the at least one request-destination personal computer in the document-box storage region, based on the storage location information.

15. The apparatus according to claim 14, wherein the autonomous-handling processing unit transmits a report communication file to the requestor personal computer, the report communication file including content indicating whether the electronic document file has been submitted or not for each of the at least one request-destination personal computers.

16. The apparatus according to claim 14, wherein:
the request specification includes a submission deadline for the electronic document file; and
the autonomous-handling processing unit transmits a demand communication file to the request-destination personal computers upon the submission falling due if any one of the at least one request-destination personal computers has not submitted the electronic document file within the submission deadline, the demand communication file including content of demanding a submission of the electronic document file.

17. The apparatus according to claim 14, wherein:
the request specification includes a submission deadline for the electronic document file; and
the autonomous-handling processing unit
transmits a demand communication file to the request-destination personal computers upon the submission falling due if any one of the at least one request-destination personal computers has not submitted the electronic document file within the submission deadline, the demand communication file including content of demanding a submission of the electronic document file, and
transmits a report communication file to the requestor personal computer, the report communication file including content indicating the one who has not submitted the electronic document file within the submission deadline for the electronic document file.

18. For an image forming system including an image forming apparatus having an image forming unit equipped with an image reading unit, an operation display unit equipped with a touchscreen for receiving user input of control operations, a storage unit having a document-box storage region, a communications interface, and a control unit configured to function as a request-job creating/request-specification configuring unit, as a communication-file creating unit, and as an autonomous-handling processing unit, the control unit, operation display unit, and document-box storage region enabling a document box function including a document submission request function, and the image forming system including a plurality of personal computers communicatively network-connected with the image forming apparatus via the communications interface, a non-transitory computer-readable recording medium storing an electronic-document-file acquisition representing program for controlling an electronic-document-file acquisition representing apparatus for autonomously representing, on behalf of one of the personal computers as a requestor, acquisition of electronic document files from any of the other personal computers as request destinations, the touchscreen in the operation display unit accepting requestor-user selection of the document box function, and of a document submission request as included in the document box function, in response to the document submission request, and the request-job creating/request-specification configuring unit executing a document-submission-request job creating process of registering a user as a secretary, the secretary being a submission destination for the acquisition of electronic document files, as requested by the document submission request, from the request-destination personal computers, the secretary registration initiating the document-submission-request job creating process, the electronic-document-file acquisition representing program causing the electronic-document-file acquisition representing apparatus to function as:

a request specification configuring unit that configures a request specification corresponding to input received from the requestor personal computer, the request specification including
- a protocol for network communications between the image forming apparatus and the plurality of personal computers,
- at least one electronic-document file request-destination personal computer,
- a requested item specifying electronic-document file content, and
- storage location information indicating an electronic-document file storage location in the document-box storage region;

a communication-file creating unit that creates a request communication file including content signifying that submission of an electronic document file created based on the requested item in the request specification is requested of the at least one request-destination personal computer; and an autonomous-handling processing unit that transmits, according to the network communications protocol, the created request communication file to the at least one request-destination personal computer, monitors response from the at least one request-destination personal computer to the transmission of the created request communication file, and stores the electronic document file submitted from the at least one request-destination personal computer in the document-box storage region, based on the storage location information.

19. The recording medium according to claim 18, wherein the autonomous-handling processing unit transmits a report communication file to the requestor personal computer, the report communication file including content indicating whether the electronic document file has been submitted or not for each of the at least one request-destination personal computers.

20. The recording medium according to claim 18, wherein:
the request specification includes a submission deadline for the electronic document file; and
the autonomous-handling processing unit transmits a demand communication file to the request-destination personal computers upon the submission falling due if any one of the at least one request-destination personal computers has not submitted the electronic document file within the submission deadline, the demand communication file including content of demanding a submission of the electronic document file.

* * * * *